T. H. SYMINGTON.
FRICTION GEAR FOR CARS.
APPLICATION FILED AUG. 23, 1910.
1,004,498.
Patented Sept. 26, 1911.
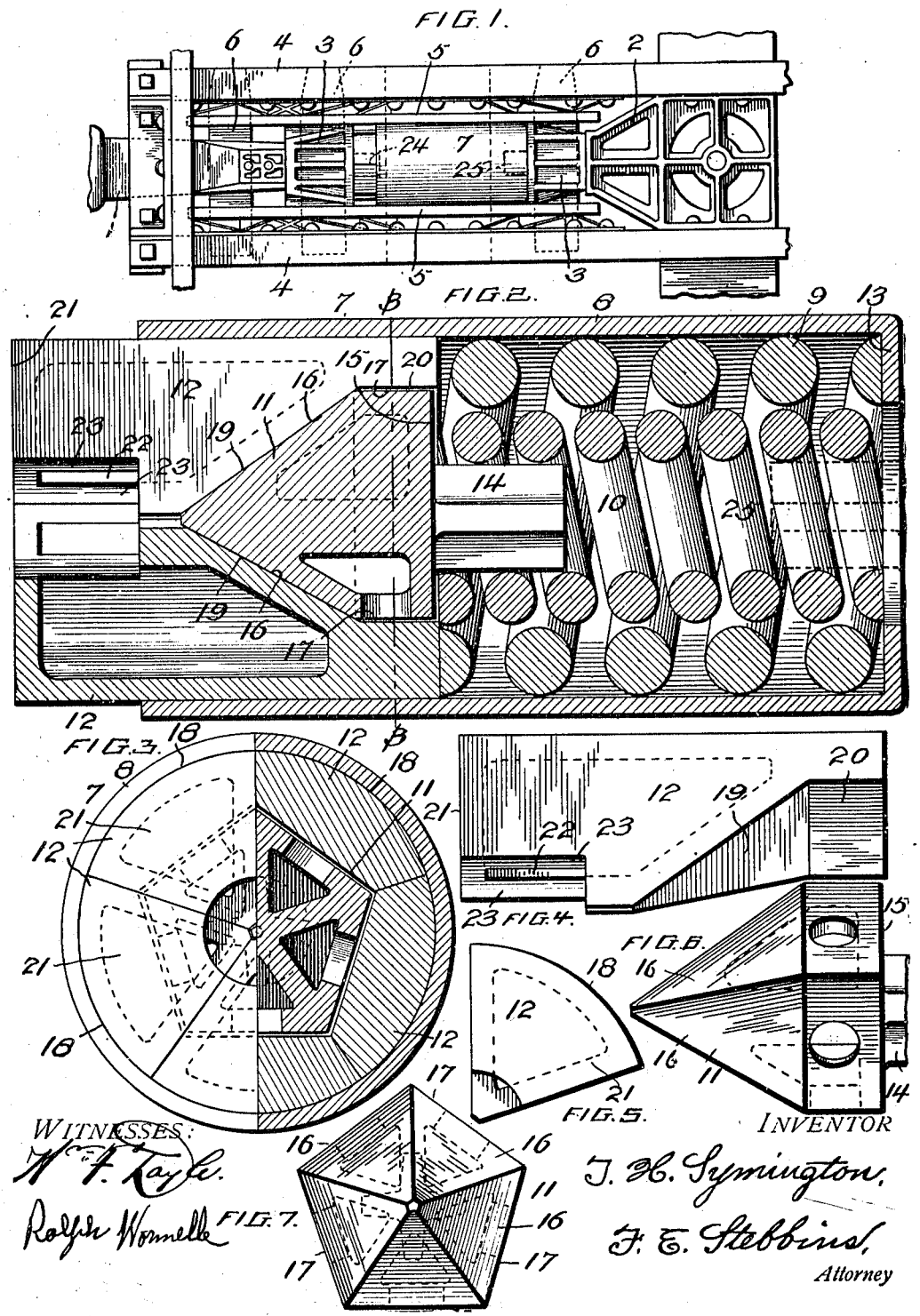

UNITED STATES PATENT OFFICE.

THOMAS H. SYMINGTON, OF BALTIMORE, MARYLAND.

FRICTION-GEAR FOR CARS.

1,004,498.   Specification of Letters Patent.   Patented Sept. 26, 1911.

Application filed August 23, 1910. Serial No. 578,594.

*To all whom it may concern:*

Be it known that I, THOMAS H. SYMINGTON, a citizen of the United States, residing at Baltimore city and State of Maryland, have invented certain new and useful Improvements in Friction-Gears for Cars, of which the following is a specification.

My invention relates to draft and buffing gear for cars, and especially to cushioning and frictional elements forming parts thereof for transforming the momentum of the car and its load or of an adjacent car or cars in a train into the work of compressing a spring or springs and moving metallic elements with their surfaces in frictional contact one relative to the other, whereby the greater part of the kinetic energy is not transmitted to the draft members or sills and to the floor frame of the car.

The main object of my invention is the provision of a combined spring and frictional device which will permit an initial compression of one of the springs before the other spring and the friction elements are brought into effective action, and in which a positive separation of the frictional elements, or a positive release of the same shall be effected by the recoil or expansion of one of the springs when it has been compressed in drawing or buffing.

My invention consists in certain novelties of construction and combinations of parts hereinafter set forth and claimed.

The accompanying drawing illustrates an example of the physical embodiment of the invention constructed and arranged according to the best mode of procedure I have so far devised for the purpose.

Figure 1 is a top plan view of a gear comprising a draw bar, followers, keys, and links, and with my improved spring and frictional device interposed between the followers. Fig. 2 is a longitudinal vertical section of the friction and spring device on an enlarged scale. Fig. 3 is a half end elevation and a half cross sectional view taken on line B—B of Fig. 1. Fig. 4 is a view in perspective of one of the friction blocks. Fig. 5 is an end elevation view of Fig. 4. Figs. 6 and 7 are side and ends views of the friction wedge.

In Fig. 1 the numeral 1 designates a slotted draw bar; 2, a filler block; 3, slotted followers; 4, slotted channel beams; 5, slotted links; 6, keys passed through the draw bar, followers, links, and channel beams; and 7 is my improved spring and friction device interposed in operative position between the followers.

The device 7 comprises a casing 8, a relatively large coiled spring 9, a relatively small coiled spring 10, a friction wedge 11, and five friction blocks 12 each of identical construction. The casing 8 is shown of a hollow cylindrical shape open at one end and provided with an inwardly extended flange 13 at the opposite end, but the casing may in practice be of a different shape in cross section.

The relatively large spring 9 is located within the casing with the coil at one end abutting the flange 13 of the casing. The relatively small spring 10 is of substantially the same length as the larger spring in this example and located inside the larger spring with one end in line with the opening in the casing bounded by the flange 13, the diameter of the spring being less than the diameter of the opening so the end of the spring can bear against the follower block at the end of the casing when the larger spring is compressed.

The friction wedge 11 has an extension or centering lug 14 at one end located within one end of the smaller spring, a plain surface 15 against which the end coil of the smaller spring abuts, and the opposite end is of the shape of a five faced pyramid, each face 16 being of a triangular shape and constituting a frictional surface. Intermediate the ends the wedge is of a pentagonal shape in cross section providing five rectangular surfaces 17 in planes parallel with the axis of the wedge.

Each friction block 12 has a convex frictional surface 18 in frictional contact with the inner surface of the casing, an inclined triangular shaped frictional surface 19 in frictional contact with a frictional surface 16 of the wedge, a plain rectangular surface 20 matching a rectangular surface 17 of the wedge, and an end wall 21 adapted to engage a follower.

The wedge and friction blocks may be cast hollow or cored in casting, as shown, or otherwise to reduce the weights of the same, and in the case of a friction block 12 shown an opening 22 is provided bounded by a curved surface 23, which surface in connection with the like surfaces of the other blocks when assembled forms a bearing for the reception of a centering lug 24 on the face of a follower, shown by dotted lines, Fig. 1; in other words, a cylindrical recess is present in the vertical face of the assembled blocks to receive the centering lug on a follower. The centering lug 25 of the rear follower may be located within the end of the smaller spring and the opening bounded by the flange 13 of the casing, as shown.

When assembled, the parts and elements of the device normally occupy the relative positions shown by Fig. 2, the ends of the friction blocks projecting a suitable distance beyond the open end of the casing, the smaller spring being fully expanded, and the larger spring slightly under compression.

The mode of operation is as follows: In buffing, the front follower moves rearwardly, forcing the friction blocks into the casing and compressing the larger spring, for example, one-half of an inch, and absorbing or cushioning the lighter shocks. At the same time the friction wedge and smaller spring are moved rearwardly, causing the smaller spring to bear at one end against the surface 15 of the wedge and at the other end against the face of the rear follower. Upon a further rearward travel of the friction blocks the smaller spring yieldingly holding the wedge causes the wedge to force the friction blocks apart so their curved surfaces frictionally engage the interior curved surface of the casing, and at the same time the triangular surfaces 19 of the blocks move over the triangular surfaces of the wedge. When pressure is removed from the draw bar the larger spring by expansive energy moves the friction blocks outwardly and effects a positive release, so the blocks and wedge do not bind or remain wedged together, which is a common occurrence in many types of friction gear heretofore designed. The wedge and smaller spring simultaneously assume the positions substantially as shown in Fig. 2 when the friction blocks are moved outwardly in the act of release. In drawing the mode of operation is substantially the same, however, as is obvious, the friction blocks are stationary, bearing against the front follower and the casing moves forwardly relative to them.

To increase or diminish the frictional resistance the angles of the frictional engaging surfaces of the wedge and the blocks relative to the axis of the wedge may be changed as the particular service may require.

While I have illustrated and specifically described only one example of the embodiment of the invention, the same may be embodied otherwise with the shapes and dimensions of the several elements changed and the disposition of parts altered without constituting substantial departures.

What I claim is:

1. A combined spring and friction device comprising a metallic casing; two springs concentrically disposed within the casing; a plurality of friction blocks arranged within the casing with their outer surfaces in frictional contact with the inner surface of the casing and their ends bearing against the outer spring only so the blocks may compress and be moved by said spring, each of said blocks having an inclined friction surface; and a wedge with its head in engagement with the end of the inner spring and its surface oblique to the axis of the wedge in frictional contact with the inclined friction surfaces of the friction blocks, and so the inner spring will force the oblique outer surface of the wedge against the inclined surfaces of the blocks.

2. A combined spring and friction device comprising a metallic casing; two springs concentrically disposed within the casing; a plurality of friction blocks arranged within the casing with their outer surfaces in frictional contact with the inner surface of the casing and their ends bearing against the outer spring, each of said blocks having an inclined friction surface; and a wedge with its head in engagement with the end of the inner spring and its surface oblique to the axis of the wedge in frictional contact with the inclined friction surfaces of the friction blocks; the said casing having an opening at the end of greater diameter than the diameter of the inner spring, whereby when the device is combined with front and rear followers the outer spring may cushion the initial shocks in buffing and drawing before the inner spring is substantially compressed.

3. A combined spring and friction device comprising a metallic casing; two springs concentrically disposed within the casing; a plurality of friction blocks arranged within the casing with their outer surfaces in frictional contact with the inner surface of the casing and their ends bearing against the outer spring, each of said blocks having an inclined friction surface; and a wedge with its head in engagement with the end of the inner spring and its surface oblique to the axis of the wedge in frictional contact with the inclined frictional surfaces of the friction blocks; the said friction blocks arranged concentrically within the casing having at their projecting ends a recess to receive the stem of a follower.

4. A combined spring and friction device comprising a metallic casing; two springs concentrically disposed within the casing; a plurality of friction blocks arranged within the casing with their outer surfaces in frictional contact with the inner surface of the casing and their ends bearing against the outer spring, each of said blocks having an inclined friction surface; and a wedge provided with a plurality of plain surfaces oblique to the axis of said wedge, having its head in engagement with the end of the inner spring only and its said plain oblique surfaces in frictional contact with the inclined friction surfaces of the friction blocks.

In testimony whereof I affix my signature in presence of two witnesses.

THOMAS H. SYMINGTON.

Witnesses:
 HENRY H. DINNEEN,
 S. L. ROMPS.